Figure 1:
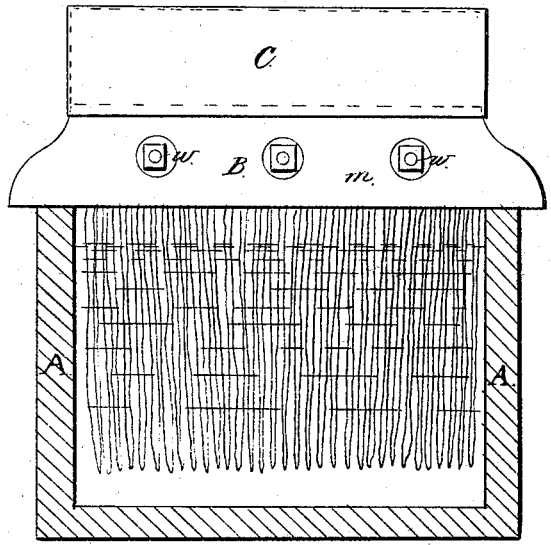
Figure 2:
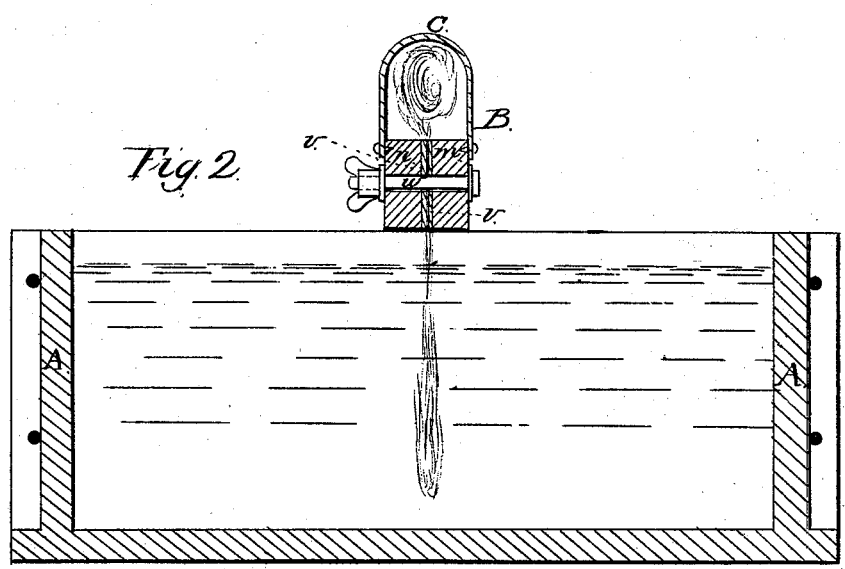

C. Barton,

Press Dyeing.

No. 99,750. Patented Feb. 15, 1870.

Witnesses:

Inventor:
Charles Barton

United States Patent Office.

CHARLES BARTON, OF PATERSON, NEW JERSEY, ASSIGNOR TO DEXTER, LAMBERT & CO.

Letters Patent No. 99,750, dated February 15, 1870.

IMPROVED FRAME FOR DYEING IN VARIOUS COLORS FOR MANUFACTURE OF SCOTCH PLAIDS, &c

The Schedule referred to in these Letters Patent and making part of the same.

*To all whom it may concern:*

Be it known that I, CHARLES BARTON, of Paterson, in the county of Passaic, in the State of New Jersey, have invented certain Improvements in the Mode of Dyeing Check and Scotch-Plaid Silk in skein for weaving purposes, of which the following is a specification.

The nature of my improvement consists in the arrangement of a frame or casing, to which the skeins of silk to be dyed are fastened, in such a manner that the shades or portions of silk undyed, or which have been previously dyed, shall be entirely protected from the liquor in the dyeing-vat, while the other portion of the skeins is in process of dyeing, convenient to sight, and that that portion of the skeins not desired to be dyed, as well as the frame or casing, shall be perfectly secured from damage by the liquor or coloring matter in the vat, and whereby the operation is performed with greater speed, and large quantities can be worked in the vat at one and the same time.

In the accompanying drawing—

Figure I represents a longitudinal section of the dyeing-vat and frame, embodying my invention.

Figure II is a cross-section of the same.

A represents the dyeing-vat, containing the desired coloring matter or liquor, constructed in the usual manner.

B is a frame, consisting of two bars, n and m, secured together by screws or bolts, w, and lined on the inner sides with India-rubber, v v; and between which the skeins of silk are secured. This frame is made of such a length as to rest upon the top of the coloring vat A, or upon bars placed upon the same.

The upper part of the bars n and m are connected by a flexible casing, C, to form a chamber to receive that part of the skeins of silk which is not to be acted upon by the dye, and to protect the same from any damage by the liquor, or while handling the frame.

The skeins of silk are securely fastened, perfectly tight, between the bars n and m; or between the pieces of India-rubber v, in such a manner as to leave only that part of the skeins which is to be dyed by the coloring matter in the vat projecting at the bottom of the frame, or of the bars n and m, while the remaining part of the skeins is placed in the chamber, above the bars n and m, formed by the casing C, so as to be perfectly protected.

The frame B is then placed upon the coloring-vat A, or upon suitable bars placed on the top of said vat, with that part of the skeins outside or below the bars n and m, suspended or immersed into the coloring-matter in the vat A, to be acted upon for the purpose of being dyed.

When the operation is completed, and the thus-dyed part of the skeins of silk perfectly dried, the same may be removed, and other parts of the skeins secured in a similar manner, and then suspended in a similar vat containing a different dye or color.

I am aware that skeins of silk have been dyed in two or more different colors, and do not claim, therefore, dyeing skeins in different colors; but

What I claim as my invention, and desire to secure by Letters Patent, is—

The arrangement and use of the frame B, consisting of two bars, n and m, lined with India-rubber pieces v, capable of being firmly secured together by suitable bolts, w, or their equivalents, and provided with a casing or chamber, C, on the upper side, substantially as and for the purpose hereinbefore set forth.

CHARLES BARTON.

Witnesses:
 JNO. BRUSH,
 M. COURTAD.